United States Patent [19]

Matsui et al.

[11] Patent Number: 4,748,017

[45] Date of Patent: May 31, 1988

[54] METHOD FOR MANUFACTURING LEPIDOCROCITE

[75] Inventors: Yasushi Matsui; Toshinori Kamisaka; Takahiko Goto, all of Yokohama; Kenichi Okazaki, Kawasaki; Norio Koike, Tokyo, all of Japan

[73] Assignee: Showa Denko Kabushiki Kaisha, Tokyo, Japan

[21] Appl. No.: 4,942

[22] Filed: Jan. 20, 1987

[30] Foreign Application Priority Data

Jan. 17, 1986 [JP] Japan ............................ 61-7310

[51] Int. Cl.$^4$ ............................................. C01G 49/06
[52] U.S. Cl. .................................... 423/634; 252/62.56
[58] Field of Search ................. 423/623, 634, 633; 252/62.56

[56] References Cited

U.S. PATENT DOCUMENTS

| | | | |
|---|---|---|---|
| 2,560,971 | 7/1951 | Martin | 252/62.56 |
| 3,082,067 | 3/1963 | Huna | 423/634 |
| 3,904,540 | 9/1975 | Bennetch et al. | 423/634 |
| 4,061,726 | 12/1977 | Ohlinger et al. | 423/634 |
| 4,061,727 | 12/1977 | Vaeth et al. | 423/634 |
| 4,086,174 | 4/1978 | Bennetch | 252/62.56 |
| 4,176,172 | 11/1979 | Bennetch et al. | 252/62.56 |
| 4,221,776 | 9/1980 | Autzen et al. | 423/632 |
| 4,396,596 | 8/1983 | Ogisu et al. | 423/634 |
| 4,464,352 | 8/1984 | Autzen et al. | 252/62.56 |
| 4,497,723 | 2/1985 | Ohlinger et al. | 252/62.56 |

FOREIGN PATENT DOCUMENTS

| | | |
|---|---|---|
| 2550308 | 5/1977 | Fed. Rep. of Germany . |
| 52-59095 | 5/1977 | Japan . |
| 52-59096 | 5/1977 | Japan . |
| 52-59097 | 5/1977 | Japan . |
| 57-77033 | 5/1982 | Japan . |
| 57-166322 | 10/1982 | Japan . |
| 57-209834 | 12/1982 | Japan . |
| 58-32028 | 2/1983 | Japan . |
| 58-140327 | 8/1983 | Japan . |

*Primary Examiner*—Patrick P. Garvin
*Assistant Examiner*—Paige C. Harvey
*Attorney, Agent, or Firm*—Sughrue, Mion, Zinn, Macpeak, and Seas

[57] ABSTRACT

Lepidocrocite suitable for obtaining excellent magnetic powders and magnetic recording media is manufactured by oxidizing an aqueous suspension of ferrous hydroxide obtained from a ferrous salt and an alkali by blowing an amount of an oxygen-containing gas into the suspension, in which the blowing amount of the oxygen-containing gas is appropriately controlled in three steps, according to three steps of the oxidation reaction of the ferrous hydroxide. In a preferred embodiment, average oxygen absorption rates in the three oxidization steps are defined and the blowing of the oxygen-containing gas is controlled thereby.

10 Claims, 1 Drawing Sheet

METHOD FOR MANUFACTURING LEPIDOCROCITE

BACKGROUND OF THE INVENTION

1. Field of the Invention

The present invention relates to a method for manufacturing lepidocrocite ($\gamma$-FeOOH). More specifically, it relates to a method for manufacturing lepidocrocite suitable as a starting material for the manufacture of magnetic powders such as magnetic iron oxide powders and magnetic metal iron powders for magnetic recording media (audio tapes, magnetic disks video tapes, and magnetic cards).

2. Description of the Related Art

Generally, magnetic iron oxide powders for magnetic recording media such as audio tapes, video tapes, magnetic disks and magnetic cards are produced from goethite ($\alpha$-FeOOH) or lepidocrocite ($\gamma$-FeOOH) as a starting material. $\alpha$-FeOOH or $\gamma$-FeOOH is subjected to the treatments such as calcination (for dehydration and inter-sintering), reduction, and to obtain maghemite ($\gamma$-Fe$_2$O$_3$) which are needle-shaped (acicular) magnetic iron oxide powders. The $\gamma$-Fe$_2$O$_3$ powders may be subjected to a further treatment of cobalt modification, to provide cobalt-coated $\gamma$-Fe$_2$O$_3$ powders (Co-$\gamma$-Fe$_2$O$_3$). Further, acicular $\alpha$-FeOOH or $\gamma$-FeOOH is subject to the treatments such as hydrogen gas reduction, while maintaining the acicular shape of the starting material to produce acicular magnetic metal iron powders.

In the above cases, the magnetic properties of the resultant magnetic powders depend on the characteristics of the starting material. Therefore, to obtain magnetic powders suitable for magnetic recording media, it is necessary to use a starting material having narrow particle size distribution, good shape and crystal structure.

Heretofore, magnetic powders produced from magnetic recording media, as the final products, such as an audio tape and a video tape which have good dispersibility and excellent magnetic orientability, squareness ratio, and print-through level but the particle size distribution of the magnetic powders produced from $\gamma$-FeOOH is so wide that the switching field distribution of the magnetic powders become high. As a result, at present, $\alpha$-FeOOH (goethite) is almost always used as the starting material for the production of $\gamma$-Fe$_2$O$_3$.

In the production of goethite ($\alpha$-FeOOH), in which an aqueous suspension of ferrous hydroxide is oxidized by blowing an oxygen-containing gas into the suspension, it is considered that the oxidation rate should be matched with the crystal growth speed. To control the oxidation rate, methods are known in which the oxidation reaction of ferrous hydroxide is carried out in several steps defined by a specified percentage of oxidation of ferrous iron in certain time periods respectively (Japanese Unexamined patent publication (Kokai) Nos. 52-59095, 52-59096 and 52-59097, corresponding to German patent application Nos. P 2250225.4, P 2550307.5 and P 2550308.6). Also known are methods in which a part of a suspension of ferrous hydroxide is taken out from a reactor containing the suspension and recirculated to the reactor. The suspension is oxidized during the recirculation, whereby the oxidation rate per one cycle is defined (Japanese Unexamined patent publication (Kokai) Nos. 57-166322, 57-209834, 58-32028 and 58-140327). However, these methods are concerned with the manufacture of goethite, not lepidocrocite.

If the feed rate of an oxygen-containing gas is controlled so that the oxidation rate is matched with the crystal growth speed in the production of lepidocrocite, the control of the feed rate must be very delicate, i.e., the particle size distribution of acicular lepidocrocite is remarkably affected by the delicacy of the control. If a feed rate of an oxygen-containing gas into a suspension for reaction is too high, the reaction rate becomes high to increase the rate of formation of a nucleus, whereby the respective acicular crystal becomes a small acicular crystal with a short length. The particle size distribution of the acicular crystal becomes wide due to the formation of many additional nuclei during the crystal growth. If a feed rate of an oxygen-containing gas is too low, the reaction rate becomes low to decrease the rate of formation of a nucleous, preventing the formation of additional nuclei during the crystal growth, but the respective acicular crystal becomes a large crystal with an extremely long length and raft-like crystal flocks, unique to lepidocrocite, are further aggregated with each other, and the resulting lepidocrocite is an undesirable crystal.

SUMMARY OF THE INVENTION

An object of the present invention is to provide a method for producing lepidocrocite which has narrow particle size distribution and good crystal structure. Also the crystals of this methed are not appreciably aggregated.

Another object of the present invention is to provide a method for producing lepidocrocite which is suitable magnetic powder for magnetic recording media. This magnetic powders have excellent magnetic properties, e.g., coercivity, switching field distribution, squareness ratio, magnetic orientability, and print-through level. These and other objects of the present invention are attained by a method for producing lepidocrocite, comprising oxidizing an aqueous suspension of ferrous hydroxide obtained from a ferrous salt and an alkali by blowing an oxygen-containing gas into the suspension, in which the blowing amount of the oxygen-containing gas is controlled appropriately in three steps according to steps of the oxidation reaction of the ferrous hydride. First and second steps are seed reaction of lepidocrocite, and third step is generation reaction.

DESCRIPTION OF THE PREFERRED EMBODIMENTS

Figure 1:
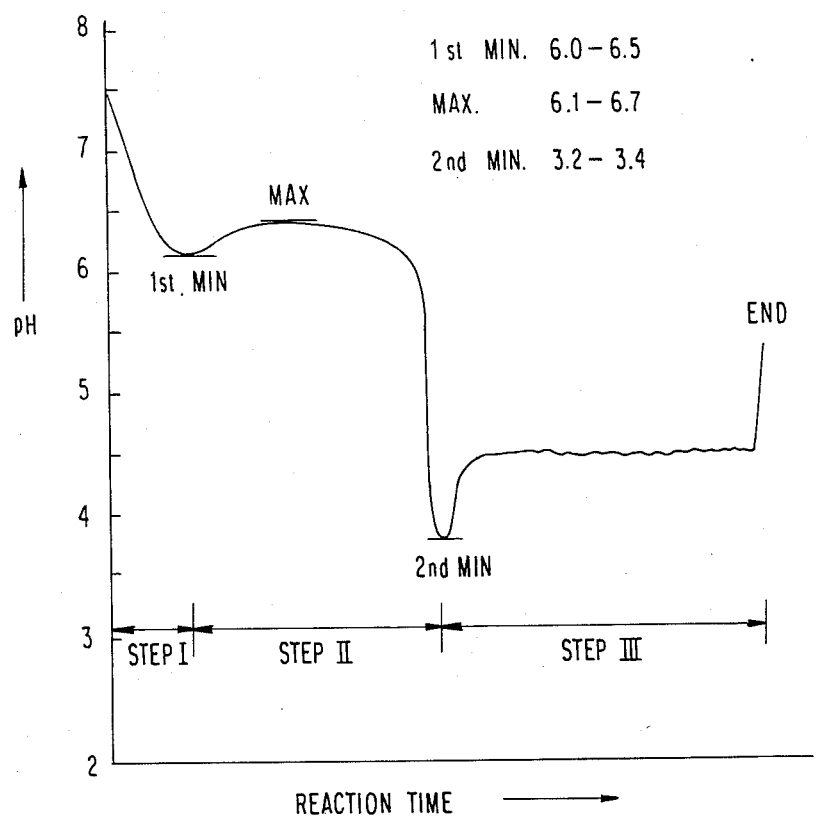
FIG. 1 is a graph showing the change of the pH of a reaction suspension during the first to third steps of the reaction for manufacturing lepidocrocite in a process according to the invention.

The three steps of the oxidation reaction, divided according to the present invention, are as follows:

First step

An aqueous suspension of ferrous hydroxide is prepared by mixing a ferrous salt such as ferrous chloride and ferrous sulfate and an alkali such as caustic alkali and ammonia. The ferrous salt and the alkali are generally mixed as an aqueous solution with stirring. The ferrous salt solution may be a waste from washing an ion-containing material (a steel strip) with an acid. The molar amount of the alkali is selected from range of from 0.3 to 0.7 times the theoretical molar amount of converting all of the ferrous salt to ferrous hydroxide. The aqueous suspension of ferrous hydroxide is oxidized at 5° to 50° C. preferably 10° to 30° C. by an oxygen-containing gas such as air or oxygen to form a green rust which is a basic salt containing Fe(II) and Fe(III), a hexagonal plate shape.

This step of the reaction is defined as the first step of the oxidation reaction. In this first step, the pH of the suspension monotonously decreases to a first minimal value, usually in a range of 6.0 to 6.5. The end point of the first step of oxidation reaction is defined as the time when the pH of the suspension reaches the above first minimal value.

Second step

The blowing an oxygen-containing gas into the suspension is continued, the color of the suspension is changed from a dark bluish green to a dark yellowish green and finally is changed to a brown. An acicular seed crystal (nucleous) of lepidocrocite ($\gamma$-FeOOH) is formed.

This step of the reaction is defined as the second step of the oxidation reaction. In this second step, the pH of the suspension is slightly increased from the first minimal value, the end point of the first step, to the first maximal value, usually in a range of 6.1 to 6.7 and then adruptly decreased to a range of 3.2 to 3.4. The end point of the second step of the oxidation reaction is defined as the pH of the suspension reaches 3.2 to 3.4 after passing through a first manial value.

Third step

When blowing an oxygen-containing gas into the suspension with stirring is continued, while gradually adding an aqueous solution of alkali such as caustic alkali or ammonia to keep the pH of the suspension within a range of 3.2 to 4.2, a crystal growth of lepidocrocite occurs. Upon end point of the generation reaction of lepidocrocite, i.e., when all of the ferrous salt is consumed, the pH of the suspension is abruptly raised. Thus, the end point of the third step of the oxidation reaction is defined as the pH of the suspension is raised to 5.5.

FIG. 1 illustrates the change of the pH of the reaction suspension with the reaction time or during the steps 1 to 3, described above.

In the above-described three steps of the oxidation reaction, according to the present invention, the blowing amount of the oxygen-containing gas is appropriately controlled.

The entire oxidation reaction of the ferrous hydroxide in this method is divided into three steps; i.e., a first step of a green rust-forming reaction, a second step of a lepidocrocite seed crystal-forming reaction, and a third step of carrying out a lepidocrocite-growth reaction, and control of the blowing of the oxygen-containing gas in each of the three steps is based on the following average oxygen absorption rates V and V' (Nl/min.-mol); the first and second step being based on the average oxygen absorption rate V, and the third step being based on the average oxygen absorption rate V':

$$V = \frac{(A-B)C/100}{D\left(\frac{E}{2D}\right)} \quad (I)$$

$$V = \frac{(A-B)C/100}{D\left(1 - \frac{E}{2D}\right)} \quad (II)$$

wherein

A is the concentration of oxygen in the blowing oxygen-containing gas (vol %),

B is the concentration of oxygen in the gas in the reactor above the suspension (vol %), C is the feed rate of the blowing oxygen-containing gas (Nl/min), D is the molar amount of ferrous ion contained in the ferrous salt (mol), and E is the molar amount of alkali consumed in the each step of the oxidation reaction (mol).

According to the experiments, the average oxygen absorption rate V in the first step is preferably is in a range of 0.095 to 0.195, more preferably 0.115 to 0.175. The oxygen absorption rate V in the second step is preferably in a range of 0.025 to 0.085, more preferably 0.035 to 0.075. The oxygen absorption rate V' in the third step is preferably in a range of 0.006 to 0.014, more preferably 0.007 to 0.013. Thus, according to a preferred embodiment of the present invention, the blowing of an oxygen-containing gas is controlled so that the average oxygen absorption rates in respective steps are in the ranges mentioned above, respectively. The average oxygen absorption rates V and V' are controlled by selecting an appropriate blowing rate C of the oxygen-containing gas, in combination with the oxygen concentration A in the blowing oxygen-containing gas, the molar amount D of the ferrous ion contained in a ferrous salt, and the molar amount E of the alkali to be consumed in each step, as well as the oxygen concentration B in the gas in the reactor above the suspension, which should be measured.

In this preferred embodiment of the present invention, in the process of oxidation of ferrous hydroxide to produce lepidocrocite, the control of the blowing of an oxygen-containing gas is based on a standard of the average oxygen absorption rate in which the oxygen concentration in the reactor is also considered. As a result, a high quality lepidocrocite is produced in this method and the reaction time can be reduced.

As mentioned before in the description of the related art, a method is known for producing goethite by oxidizing a mixture of aqueous ferrous salt and alkali solutions with an oxygen-containing gas, in which the feeding rate of the oxygen-containing gas is increased in three steps so that the amount of oxidation of ferrous ion is increased in three steps (Japanese Unexamined patent publication (Kokai) Nos. 52-59095, 52-59096 and 52-59097). However, this relates to the production of goethite ($\alpha$-FeOOH) from a ferrous salt, which is different from production of lepidocrocite ($\gamma$-FeOOH) from a ferrous salt in the present invention. The way of producing goethite and lepidocrocite, starting materials, crystal structure and particle shape of the products, and the process of the synthesis are quite different in these two methods. The crystal shape of goethite resembles a bar, but that of lepidocrocite resembles a raft. Therefore, the technique disclosed in the above publications cannot be applied to a method for producing lepidocrocite. For example, in the methods disclosed in the above publications, the rate of oxidation starts at low and is increased stepwise, but the change of the oxidation rate in the method of the present invention is almost reversed. This is due to differences in the crystal structure and crystal shape between goethite and lepidocrocite. As a result, the oxidation in the method of the present invention must be conducted in a reactor under strict control, while determining the oxygen concentration in a gas in the reactor. On the other hand, but the oxidation can be conducted in the atmosphere in the methods described in the above publications.

The method according to the present invention can be conducted in the same manner as in the conventional methods for producing lepidocrocite, except that the control of the blowing of an oxygen-containing gas is appropriately carried out in three steps under particular conditions.

According to a method of the present invention, lepidocrocite is obtained which has an narrow particle size distribution and good crystal structure. Also the crystals of this method are not appreciably aggregated. As a result, this lepidocrocite allows the production of superior magnetic powders such as magnetic iron oxide powders and magnetic metal iron powders.

The present invention is further described below, but it is not intended to limit the scope of the present invention.

EXAMPLE 1

Into 25 liters of an aqueous ferrous chloride solution (0.97 mol/l) in the reactor with stirring under nitrogen atmosphere, 42 liters of an aqueous sodium hydroxide solution was added and the resultant mixture was aged for 30 minutes.

The mixture of the solutions or a suspension mainly of ferrous hydroxide was kept at 15° C. and air was blown into the mixture from the bottom of the reactor at a ratio of 19.7 Nl/min to begin the first step of the oxidation reaction, i.e., formation of green rust. As the reaction proceeded, the pH of the suspension decreased and reached a minimum value of 6.2.

At this time, the blowing rate of air was decreased to 7.5 Nl/min to start the second step of the oxidation reaction, i.e., formation of lepidocrocite seed crystal. As the reaction proceeded, the pH of the suspension increased to reach a maximal value of 6.4, and then decreased to reach a minimal value of 3.2 after 75 minutes from the start of the second step.

Then, the blowing rate of air was decreased to 1.87 Nl/min and the temperature in the reactor was raised to 45° C. At the same time, an aqueous sodium hydroxide solution with the concentration of 0.9 mol/l was added at a constant rate of 80 g/min. This was the third step of the oxidation reaction, i.e., growth of lepidocrocite crystal. In this third step, the pH of the suspension was kept at 3.2. After the reaction had proceeded for a certain period of time, the pH of the suspension could not be kept at 3.2 and began to increase. The third step was completed when the pH of the suspension reached a value of 5.5.

The oxygen concentrations of a gas in the reactor above the suspension in the first, second, and third steps were 10 vol %, 10 vol %, and 16.0 vol %, respectively. Note, it was confirmed that no air entered the reactor, except for the air blown from the bottom of the reactor.

Therefore, the average oxygen absorption rates in the first, second, and third steps can be calculated as follows:

First step:
$$V = \frac{(21 - 10) \times 19.7 \div 100}{24.25 \times \left(\frac{29.82}{2 \times 24.25}\right)} = 0.145 \ (Nl/min \cdot mol)$$

Second step:
$$V = \frac{(21 - 10) \times 19.7 \div 100}{24.25 \times \left(\frac{29.82}{2 \times 24.25}\right)} = 0.055 \ (Nl/min \cdot mol)$$

Third step:
$$V = \frac{(21 - 16) \times 1.87 \div 100}{24.25 \times \left(1 - \frac{29.82}{2 \times 24.25}\right)} = 0.010 \ (Nl/min \cdot mol)$$

Thus resultant lepidocrocite was fired, reduced, and oxidized in a conventional manner to obtain acicular maghemite ($\gamma$-Fe$_2$O$_3$), and the magnetic characteristics of the maghemite were measured. The results were as follows:
coercivity $H_c$ = 410 Oë;
squareness ratio SR = 0.46;
specific surface area SSA = 37.5 m$^2$/g.

Further, the acicular maghemite was chased and made into a coating material, which was coated on a plastic film and oriented in a magnetic field in a conventional manner, to produce a magnetic tape. The magnetic properties of the magnetic tape were measured, in which the switching field distribution and orientation ratio were measured by vibrating sample magnetometer (VSM). The results were as follows:
coercivity $H_c$ = 395 Oë;
squareness ratio SR = 0.89;
orientation ratio OR = 3.46;
switching field distribution SFD = 0.30.

EXAMPLE 2 (COMPARITIVE)

Example 1 was repeated except that the air blowing rates in the first, second, and third steps of the oxidation reaction were 10.0 Nl/min, 2.3 Nl/min, and 0.67 Nl/min, respectively.

The resultant average oxygen absorption rates in the first, second, and third steps were 0.087 Nl/min.mol, 0.020 Nl/min.mol, and 0.005 Nl/min.mol, respectively.

The obtained lepidocrocite was treated in the same way as in Example 1 to produce acicular maghemite and a magnetic tape, and the magnetic properties of the maghemite and magnetic tape were measured. The results were as follows:
Maghemite: $H_c$ = 365 Oë; SR = 0.42; SSA = 28.5 m$^2$/g
E is the molar amount of alkali consumed in each step of the oxidation reaction (mol).

The magnetic properties in Examples 1 and 2 are shown in Table 1.

TABLE 1

| Properties | Example 1 | Example 2 |
|---|---|---|
| (1) Maghemite | | |
| coercivity, Oe | 410 | 365 |
| Squareness ratio | 0.46 | 0.42 |
| Specific surface area, m$^2$/g | 37.5 | 28.5 |
| (2) Magnetic tape | | |
| Coercivity, Oe | 395 | 368 |
| Squareness ratio | 0.89 | 0.80 |
| Orientation ratio | 3.46 | 3.20 |
| Switching field distribution | 0.30 | 0.36 |

In Table 1, a low switching field distribution signifies a more uniform particle distribution.

We claim:

1. A method for producing lepidocrocite, comprising preparing an aqueous suspension of ferrous hydroxide by mixing a ferrous salt and an alkali in an amount of 0.3 to 0.7 times the theoretical amount necessary for converting all of the ferrous salt to ferrous hydroxide in a reactor, blowing an oxygen-containing gas into the suspension to form a seed crystal of lepidocrocite, and completing a growth reaction of lepidocrocite by blowing an oxygen-containing gas into the suspension with adding an alkali into the suspension, in which:

the entire oxidation reaction of the ferrous hydroxide conducted by blowing the oxygen-containing gas in said method is divided into three steps, comprising a first step of carrying out a green rust-forming reaction, a second step of carrying out a lepidocrocite seed crystal-forming reaction, and a third step of carrying out a lepidocrocite-generation reaction, and control of the blowing of the oxygen-containing gas in each of said three steps is based on the following average oxygen absorption rates $V$ and $V'$ (Nl/min.mol), said first and second step being based on the average oxygen absorption rate $V$, said third step being based on the average oxygen absorption rate $V'$:

$$V = \frac{(A - B)C/100}{D\left(\frac{E}{2D}\right)}$$

$$V' = \frac{(A - B)C/100}{D\left(1 - \frac{E}{2D}\right)}$$

wherein

A is the concentration of oxygen in the blowing oxygen-containing gas (vol %),

B is the concentration of oxygen in the gas in the reactor above the suspension (vol %), C is the feed rate of the blowing oxygen-containing gas (Nl/min), D is the molar amount of ferrous ion contained in the ferrous salt (mol), and E is the molar amount of alkali consumed in each step of the oxidation reaction (mol).

2. A method according to claim 1, wherein the blowing of the oxygen-containing gas in said first step is controlled so that the average oxygen absorption rate $V$ is in a range of 0.095 to 0.195.

3. A method according to claim 2, wherein the blowing of the oxygen-containing gas in said first step is controlled so that the average oxygen absorption rate $V$ is in a range of 0.115 to 0.175.

4. A method according to claim 1, wherein the blowing of the oxygen-containing gas in said second step is controlled so that the average oxygen absorption rate $V$ is in a range of 0.025 to 0.085.

5. A method according to claim 4, wherein the blowing of the oxygen-containing gas in said second step is controlled so that the average oxygen absorption rate $V$ is in a range of 0.035 to 0.075.

6. A method according to claim 1, wherein the blowing of the oxygen-containing gas in said third step is controlled so that the average oxygen absorption rate $V'$ is in a range of 0.006 to 0.014.

7. A method according to claim 6, wherein the blowing of the oxygen-containing gas in said third step is controlled so that the average oxygen absorption rate $V'$ is in a range of 0.007 to 0.013.

8. A method according to claim 1, wherein said first step of the oxidation reaction is defined from the start of the oxidation reaction to the time when the pH of the suspension reaches a first minimal value.

9. A method according to claim 1, wherein said second step of the oxygen reaction is defined from the end of said first step to the time when the pH of the suspension reaches 3.2 to 3.4 after passing through a first maximal value.

10. A method according to claim 1, wherein said third step of the oxidation reaction is defined from the end of said second step to the time when the pH of the suspension is raised to about 5.5, where the blowing the oxygen-containing gas is continued with adding the alkali to keep the pH of the suspension is a range of 3.2 to 4.2.

* * * * *